Oct. 7, 1958    A. W. ANDERSON    2,854,840
MAGNETIC MARKER WIRE
Filed Sept. 28, 1956
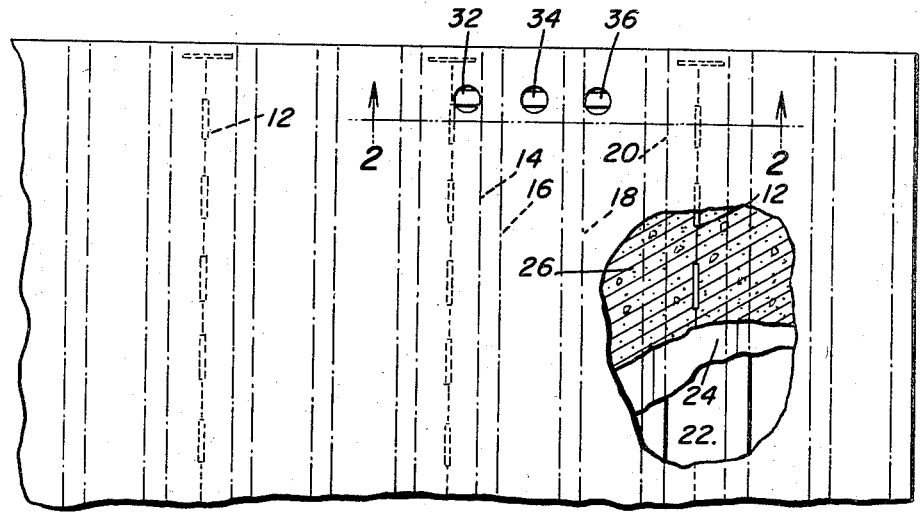
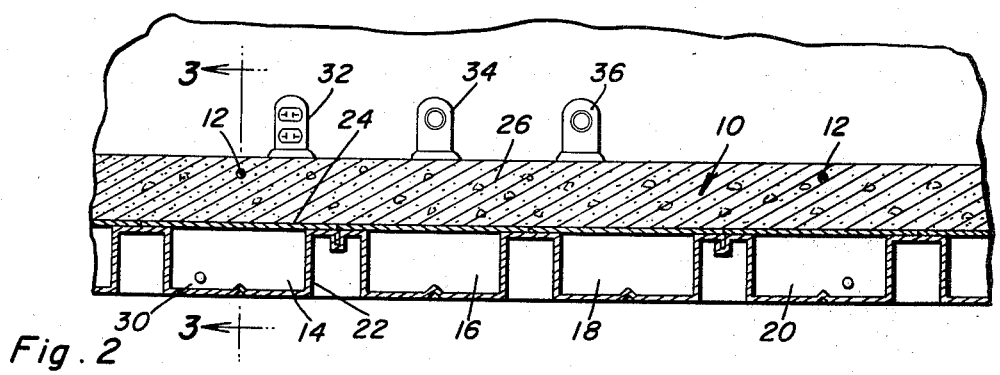
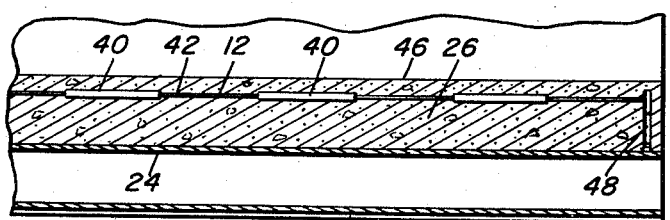
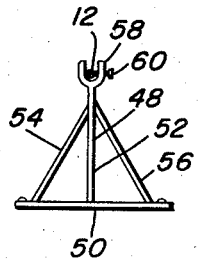
Aaron W. Anderson
INVENTOR.

United States Patent Office 2,854,840
Patented Oct. 7, 1958

2,854,840

MAGNETIC MARKER WIRE

Aaron W. Anderson, Salt Lake City, Utah

Application September 28, 1956, Serial No. 612,716

2 Claims. (Cl. 72—16)

This invention relates to floor construction and more particularly to a novel magnetic marker wire adapted to be utilized in conjunction with electrical floor systems or cellular floor systems for aiding in locating the tubular conduits or the like of the floor system.

The construction of this invention features a plurality of wire magnets which are arranged in end-to-end spaced but aligned relationship which magnets are interconnected by wire sections so as to form an elongated length of material easily laid on chairs in spaced relationship directly above the center or other portion of the various cells of a cellular floor system such as are used for electrical distribution and the like.

This invention is adapted not only for use with utility wires but for anything that is embedded or placed under cement such as pipe, etc.

An important object of the invention resides in the provision of a magnetic indicator for locating the cells through a cellular floor system which can indicate the extent of the cell along its whole length while preventing deterioration of the strength of the magnet by holding the magnets in spaced relationship.

Still further objects and features of this invention reside in the provision of a magnetic marker wire for electrical floor systems that is simple in construction, easy to install and inexpensive to utilize thereby permitting wide use and distribution.

These, together with the various ancillary objects and features of the invention which will become apparent as the following description proceeds, are attained by this magnetic marker wire, a preferred embodiment of which has been illustrated in the accompanying drawings, by way of example only, wherein:

Figure 1 is a plan view of a portion of an electrical or cellular floor system employing the present invention;

Figure 2 is an enlarged sectional detail view as taken along the plane of line 2—2 in Figure 1 illustrating the magnetic marker wire in position above power cells;

Figure 3 is an enlarged sectional detail view as taken along the plane of line 3—3 in Figure 2; and Figure 4 is an elevational view of one of the brackets forming chairs for the magnetic marker wire.

With continuing reference to the accompanying drawings wherein like reference numerals designate similar parts throughout the various views, reference numeral 10 generally designates a cellular or electrical floor system which in combination with the magnetic marker wire 12 comprise the present invention. This electrical floor system is constructed of a plurality of cells as indicated at 14, 16, 18, 20, etc., which are arranged in parallel spaced relationship and formed out of any suitable material such as sheet metal or the like. The cells 14, 16, 18, 20, etc. are preferably constructed of interlocked sheet metal members 22 and include other sheet metal members 24 which overlie the members 22 to form an upper plate for receiving a layer of cementitious material 26 thereon. Of course, suitable beams, joists or the like may be used for further supporting the floor or in lieu thereof the metallic material used in constructing the cells 14, 16, 18 and 20 may be of adequate strength to support the floor. In addition, suitable reinforcing material may be used and such may be embedded in the cementitious material 26 such as concrete or the like.

Each of the cells 14, 16, 18, etc. may be used for different purposes. The cell 14 is shown for use as a power cell in which electrical conductors forming an electrical distribution system are adapted to be located. A signal cell 16 may be provided for having various conductors of electrical signalling apparatus located therein. These conductors may be for burglar alarms, fire alarms or any other type type of annunciator or signal devices. The cell 18 is shown adapted for reception of telephone cables and the like. Obviously, further utilities such as water or gas may be positioned in the cells.

In order to connect other conductors to the conductors as indicated at 30, for example in the power cell 14, or install additional electrical outlets such as the outlet 32 or signal or telephone outlets as at 34 and 36, it is necessary to have access to the cells. Further, to determine where the desired cell is located is usually inaccurate and any visual marker during the passage of these may be misplaced. Thus, the present invention including the marker wires 12 provide positive means for locating the various cells so that access may be had to a particular cell as may be desired. If it is desired to identify the power cells by the use of the magetic marker wires 12, a readily identifiable means is provided by this invention. In combination with the electrical floor system 10, the marker wires 12 consist of a plurality of elongated bar-shaped magnets formed of a suitable magnetic wire and indicated at 40 which are arranged in end-to-end spaced but aligned relationship. Interconnecting the magnets 40 are sections of wire 42 of a non-magnetic material. Thus, because the magnets 40 are held in spaced relationship from the plate 24 of the cellular constructions, very little magnetism will be lost during the passage of time. The magnetic marker wire 12 is embedded in the cementitious material 26 adjacent the upper edge 46 thereof and held adjacent their upper edge by means of brackets forming chairs as indicated at 48. Each of the brackets 48 includes a base 50 having an upright 52 rising therefrom and rigidified by means of braces 54 and 56. The upper end of the upright 52 is bifurcated as at 58 and a threaded clamping screw 60 is provided for holding the magnetic marker wire in position clampingly held in place when it is inserted in the bifurcated end 50 and the screw 60 tightened.

The magnetic marker wire can be located at any time after construction of the floor system by the use of a simple compass. The needle of a compass will align itself with their magnetic poles of the various magnets 40 and once the marker is located, a hole can be drilled through the floor to the cell below without injury or loss of the magnetic marker wire or large scale disturbance to the floor system.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cellular floor system comprising a plurality of elongated tubular conduits arranged in parallel spaced relationship, a layer of cementitious material overlying said conduits, and a plurality of magnetic marker wires disposed above and spaced from said conduits and embedded in said cementitious material, each of said magnetic marker wires including a plurality of wire magnets arranged in end-to-end spaced relationship, and a plurality of non-magnetic sections of wire interconnecting said magnets to form continuous wires.

2. A cellular floor system comprising a plurality of elongated tubular conduits arranged in parallel spaced relationship, a layer of cementitious material overlying said conduits, and a plurality of magnetic marker wires disposed above and spaced from said conduits and embedded in said cementitious material, a plurality of brackets forming chairs disposed on said conduits, said magnetic marker wires being carried by said chairs adjacent the upper surface of said cementitious material, each of said magnetic marker wires including a plurality of wire magnets arranged in end-to-end spaced relationship, and a plurality of non-magnetic sections of wire interconnecting said magnets to form continuous wires.

References Cited in the file of this patent

UNITED STATES PATENTS

| | | |
|---|---|---|
| 1,461,492 | Moody | July 10, 1923 |
| 1,975,976 | Robinson | Oct. 9, 1934 |
| 2,043,367 | Bitney | June 9, 1936 |
| 2,187,087 | Leary | Jan. 16, 1940 |
| 2,527,681 | Lewis et al. | Oct. 31, 1950 |
| 2,558,977 | Pearson | July 3, 1951 |
| 2,783,639 | Werner | Mar. 5, 1957 |